March 6, 1934.  P. L. BANNAN  1,949,643
TRANSMISSION GEARING
Filed Oct. 7, 1931
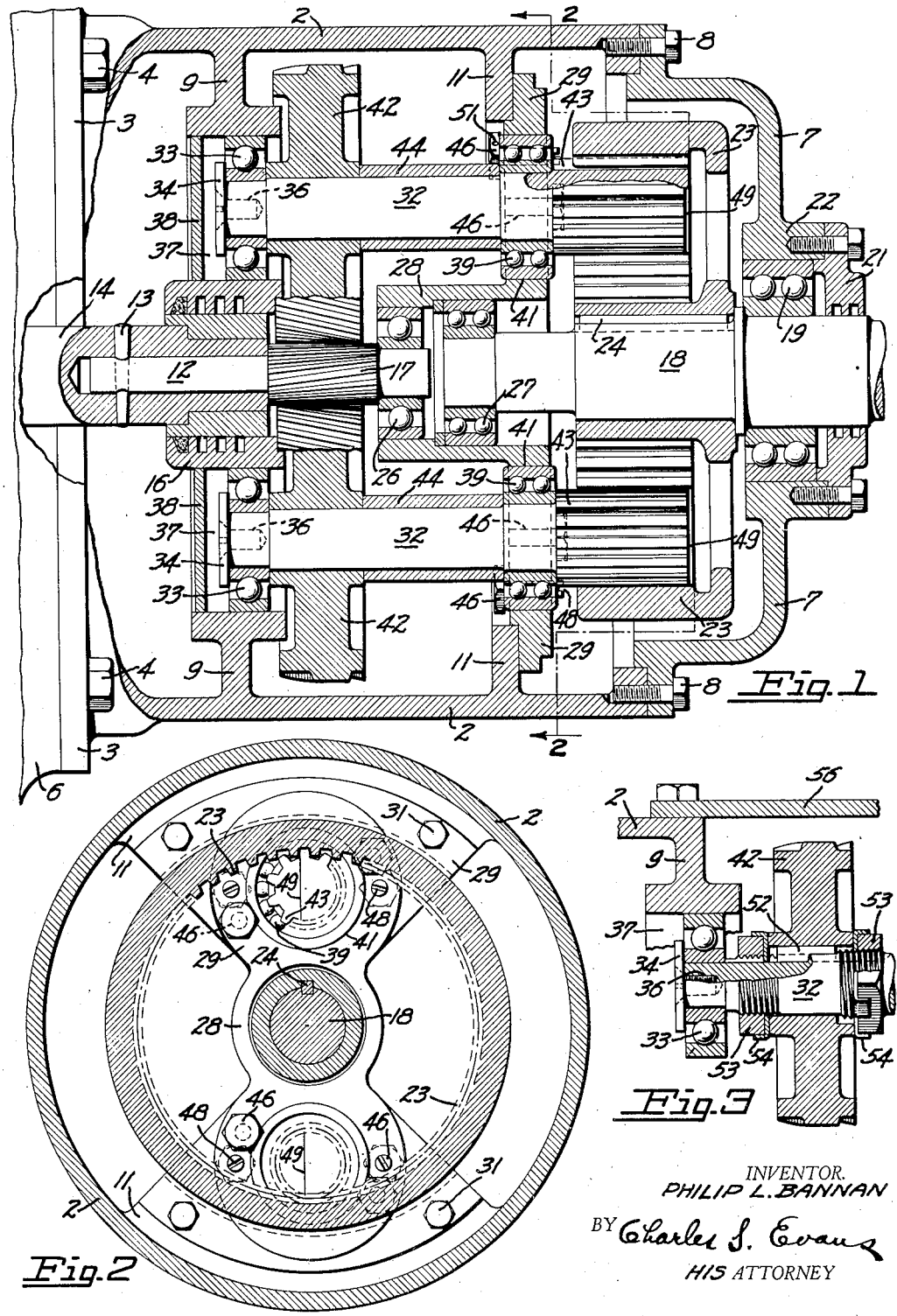
INVENTOR.
PHILIP L. BANNAN
BY Charles S. Evans
HIS ATTORNEY Patented Mar. 6, 1934

1,949,643

UNITED STATES PATENT OFFICE 1,949,643

TRANSMISSION GEARING

Philip L. Bannan, San Francisco, Calif., assignor to Pacific Gear and Tool Works, San Francisco, Calif., a corporation of California Application October 7, 1931, Serial No. 567,352

4 Claims. (Cl. 74—7)

My invention relates to transmission gearing and particularly to reduction gear units.

One of the objects of my invention is the provision in a transmission, where the torque from the drive shaft is transmitted to the driven shaft by duplex intermediate gearing, of means for equalizing the distribution of torque between the intermediate gearing so that each gear carries its share of the load.

Another object of my invention is the provision of means for quickly and accurately synchronizing transmission gearing incorporating drive and driven shafts connected by a plurality of like gear trains.

Another object of my invention is the elimination, to a large degree, of the extreme accuracy of gear tooth registration heretofore practiced in the construction of transmission gear devices including duplicate gear trains.

Still another object of my invention is the provision of a transmission gear unit which does not require, for replacement purposes, exact matching of the part to be replaced.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view, in section, of the preferred embodiment of my invention. Parts of the view are shown in elevation and parts are broken away to disclose the construction more clearly.

Figure 2 is a sectional view taken in a plane indicated by the line 2—2 of Figure 1.

Figure 3 is a sectional view of a modified form of mounting for the intermediate gear.

In broad terms the transmission of my invention comprises a pair of shafts, such as driving and driven shafts, connected by a plurality of gear trains, and embodying means for adjustment so that each train is subjected to the same torque. One of the gear trains includes meshed helical gears; and means are provided for longitudinal adjustment of one of these gears so that the resulting rotary movement effects the desired adjustment. Means are also provided for indicating the desired alignment of the shafts.

In greater detail, the transmission of my invention comprises a housing 2, having a flange 3, adapted to be secured by the bolts 4, to the frame of a motor or other prime mover 6. A cover plate 7, secured to the housing by means of the capscrews 8, serves together with the wall 9 and flanges 11, to support the various shaft bearings.

A driving shaft 12, secured by means of a taper pin 13, is seated in the end of the shaft 14 of the prime mover; and the connected shafts are journaled in a hub 16, which forms part of the wall 9. The driving shaft gear 17 is a spiral gear and is preferably formed integrally with the shaft 12.

A driven shaft 18 is disposed in the housing, preferably in axial alinement with the driving shaft; and is journaled in a ball bearing 19, secured by a retaining cap 21, in a hub 22, forming part of the cover plate 7. A driven gear 23 is provided on the shaft 18; and is preferably an internal ring gear whose teeth are in parallelism with the driven shaft axis. The ring gear is secured by means of the key 24, for rotation with the shaft 18.

Support for the outer ends of the driving and driven shafts is provided by ball bearings 26 and 27 respectively, disposed in a hub 28 projecting from a web or cross member 29 secured by the bolts 31, to the flanges 11 of the housing.

A plurality, preferably two, of like intermediate gear trains, each including the helical driving gear 17 and the driven ring gear 23, is provided for operatively connecting the driving and driven shafts. Disposed adjacent to, on diametrically opposite sides of, and in parallelism with the driving and driven shafts are a plurality of intermediate shafts 32, one end of each of which is provided with a ball bearing 33, suitably secured on the shaft by a retaining washer 34, held by a screw 36, threaded into the end of the shaft. The outer race of each bearing is slidable axially in a circular aperture 37, which is formed in the wall 9 of the housing. A circular plate 38 pressed into the aperture serves to prevent the escape of lubricants from the transmission housing into the motor mechanism.

Disposed adjacent the other end of each shaft 32, is a second ball bearing 39, whose outer race, like that of the bearings 33, is slidable axially in a circular aperture 41 formed in the web 29. An intermediate gear 42 having spiral teeth meshing with those of the driving gear 17 is either pressed or shrunk on each shaft 32 adjacent the bearing 33; and an intermediate pinion 43, meshing with the ring gear 23, is preferably integrally formed with the opposite end of each shaft adjacent the bearing 39. A sleeve 44 is disposed on each shaft to maintain spaced relationship between the gear 42 and the bearing 39.

From the above it will be clear that the driven and driving shafts, are connected by two like gear trains, each of which, if the gears are in proper adjustment, carry an equal proportion of the load.

Means are provided for axially moving the intermediate helical gear relative to its meshed driving gear so that the resulting relative rotary movement can be utilized to adjust the gears by taking up all lost motion between them. To permit this axial movement without loss of tooth bearing surface, the gears 17 and 43 are longer than their meshing gears. The bearings 39 are adjustably secured in position in the web 29 by oppositely disposed screws 46 arranged in pairs as best shown in Figure 2. The heads of the screws overlie the faces of the outer race of the bearing; the bearing being securely locked between the screw heads. By releasing the screws on one side and turning the opposite screws, the bearing may be shifted axially. The ends of the screws, exposed when the cover plate 7 is removed are provided with slots 48 to facilitate their manipulation.

One of the main causes of failure in transmission devices of this character, i. e., where the power transmitted is divided between a plurality of intermediate gear trains has been due to the extreme difficulty of securing proper adjustment of tooth pressure so that each branch of the intermediate gear trains carries an equal share of the load. It is obvious that this adjustment must be accurate within narrow limits; otherwise the load is imposed on one branch alone, resulting ultimately in undue wear and failure of the working parts.

The cost of production of a satisfactory device of this character has heretofore been excessive due to the accuracy required in the machining and assembly of the parts. Only a slight error, whether it be caused, for instance by a very small difference in the working depth of the teeth of two corresponding gears or by an angular difference in the registration of the teeth of two intermediate shaft mounted gears, is sufficient to throw all of the transmitted load into one or the other of the intermediate gear trains with the result that this train soon fails.

All of these difficulties have been overcome in the transmission of my invention by providing at least one of the intermediate gear trains with means whereby the torque may be equally divided between it and its companion mechanism. The angular registration of the teeth of the two intermediate shaft-mounted gears may be disregarded as any difference in the relationship between the teeth of corresponding gears in a train is compensated for by the proper setting up of the adjustable gear train. It follows from this that the precision methods of machining and assembly inherently necessary in non-adjustable devices of this character may be dispensed with in the transmission of my invention; the only accurate requirement in the present device being that the center-to-center distances of the various shafts and their axial and parallel alinement be reasonably accurate. Of course accurately cut gears are also required.

If the intermediate gear 42 be moved axially along the driving gear 17, a rotary movement will be imparted to the intermediate shaft by reason of the teeth of the larger gear sliding along those of the smaller gear. This rotary movement is utilized to advance or retard the teeth of the intermediate pinions 43 so that correct alinement is obtained between them and those of the driven ring gear 23. Movement of the gear to secure this adjustment is effected by shifting the bearings of either or both of the shafts 32, as already explained.

Means are provided for indicating when correct circumferential alinement of the gears obtains. During the process of cutting the teeth on the intermediate pinion a milling cutter is passed over the end of the gear so that a shoulder 49 is formed thereon. When the teeth in the driven gear is an even number, the shoulder 49 is located, in relation to a tooth, identically in each of the gears produced.

It will be seen that the shoulders referred to play an important part in the adjustment of the mechanism. Since the cover plate 7 and the driven gear 23 must necessarily be removed to permit access to the screws 46, it is obvious that without a visual indication of the correct correlation of the pinions and the absent gear, the adjustment of the parts would be more or less of an approximation rather than an accurate result.

Knowing that the position of the shoulder, with reference to a tooth, is identical on each pinion the mechanic need only assemble the gears so that the shoulders on the gears are in linear alignment, which may be accomplished by placing a straight-edge against both shoulders and manipulating the screws 46 to bring the straight-edge to a full seat thereon.

The heads of the screws 46 are provided with drilled holes 51 by means of which the screw heads may be wired together and locked when the final adjustment of the screws has been completed.

A modified form of mounting for the intermediate gear on the shaft 32, is shown in Figure 3. In this construction the gear 42, is slidably disposed on the shaft; and is secured for rotation therewith by means of the key 52. Portions of the shaft are threaded to receive the adjusting nuts 53; and winged lock washers 54 are provided for locking the nuts against rotation when the correct adjustment of the gears has been obtained. It is obvious that with the use of this type of intermediate gear mounting; the screws 46 may be dispensed with and the bearings 33 and 39 are fixed in the housing. Access to the adjusting nuts is obtained thru a suitable aperture in the housing normally covered by a plate 56.

The use of duplex or multiplex intermediate drives permits the use of smaller gears to give the same load carrying capacity, resulting in a more compact and smaller mechanism than is possible with a singly geared transmission. Transmissions of the character described have been built and successfully operated under transmitted loads as high as 200 horsepower; and have found particular usefulness in the driving of slow speed pumps with high speed motors.

I claim:

1. A device of the character described, comprising driving and driven shafts, a helical gear on one of the shafts, a gear on the other of the shafts, a plurality of intermediate shafts, gears on each intermediate shaft and meshing with the gears on the driving and driven shafts, a fixed element, a bearing for one of the intermediate shafts and slidably disposed in the fixed element, and a plurality of adjusting screws disposed between the fixed element and the shaft bearing for axially adjusting the intermediate shaft.

2. In a device of the character described, a driving shaft, a driven shaft, a pinion having helical teeth secured to the driving shaft, a gear fixed on the driven shaft, a plurality of intermediate shafts, gears on the intermediate shafts and meshing with the helical gear, pinions on each of the intermediate shafts and meshing with the driven gear, a fixed element, a bearing for one of the intermediate shafts and slidably disposed in the fixed element, and a plurality of adjusting screws disposed between the fixed element and the shaft bearing for axially adjusting the intermediate shaft.

3. In a device of the character described, a driving shaft, a pinion secured to the driving shaft and provided with helical teeth, a driven shaft, a ring gear secured to the driven shaft, a pair of intermediate shafts, each intermediate shaft being provided at one end with a gear having helical teeth meshing with those of the driving shaft pinion and at the other end with a pinion meshing with the ring gear, a housing for the shafts, bearings on the intermediate shafts and slidably disposed in the housing and a plurality of screws threaded into the housing and having heads engaging the bearings for axially adjusting the intermediate shafts.

4. In a device of the character described, a driving shaft, a pinion secured to the driving shaft and provided with helical teeth, a driven shaft, a ring gear secured to the driven shaft, a pair of intermediate shafts, each intermediate shaft being provided at one end with a gear having helical teeth meshing with those of the driving shaft pinion and at the other end with a pinion meshing with the ring gear, a housing for the shafts, bearings on the intermediate shafts and slidably disposed in the housing, a plurality of screws threaded into the housing and having heads engaging the bearings for axially adjusting the intermediate shafts, and means on each of the intermediate shafts for indicating circumferential alinement of corresponding intermediate shaft pinions.

PHILIP L. BANNAN.